July 16, 1974   F. G. FAGAN, JR   3,824,129
HEART PACER RECHARGEABLE CELL AND PROTECTIVE CONTROL SYSTEM
Filed March 14, 1973   3 Sheets-Sheet 1

United States Patent Office 3,824,129
Patented July 16, 1974

3,824,129
HEART PACER RECHARGEABLE CELL AND PROTECTIVE CONTROL SYSTEM
Franklin G. Fagan, Jr., Ossining, N.Y., assignor to P. R. Mallory & Co., Inc., Indianapolis, Ind.
Filed Mar. 14, 1973, Ser. No. 341,205
Int. Cl. H01m 43/00
U.S. Cl. 136—6 R                           9 Claims

ABSTRACT OF THE DISCLOSURE

A heart pacer system having an electric cell with improved internal cell structure and control system, with relatively high-conductivity depolarizer to accept recharging, in place as implanted, by induction and through a rectification system, at relatively fast rate, with protective control system to prevent harmful effects in the cell, and thereby to assure safety to the wearer during recharging, with an end result of service from the implanted cell in excess of ten years, without need for an incision to replace implanted cell by a new cell.

---

This invention relates to an electrical heart-control system, of the type termed "pacemaker," and includes a highly improved electric battery cell, which may be safely recharged in its normal operative implanted position, under the protective skin of a human body; and the invention further includes a safety protective system, to assure safe and effective recharging of a cell, and to prevent detrimental excessive and dangerous activation within the implanted cell, during such recharge, that could otherwise be dangerous to the wearer if not so controlled.

With present conventional heart-control protective systems, the conventional battery or cell available for use in such systems cannot be safely recharged. Therefore, it is necessary to periodically replace the primary cell that serves as the source of energy. The present conventional cell does have a reliable assurance of adequate operating energy and voltage for a period of twenty months, and may actually extend, but not reliably certain, to twenty-four months. The period or operating term of twenty months is therefore taken to be the limit of the term of reliable assurance for use of such cells as primary cells, for this application. At present it is conventionally necessary to replace such operating cell with a new cell, at the end of each such operating term of twenty months. Such replacement conventionally requires a surgical operation involving an incision, to remove the terminated cell and to substitute the new cell.

The limitation in the length of the useful terms of a conventional implanted cell has been due to two conditions, namely, (1) lack of a reliable rechargeable cell; which must necessarily be small enough to fit within tolerable dimensional limits to permit convenient and safe disposition within the limited available free space in the human body of a wearer; and (2) the lack of an effective and safe system for recharging the cell, in place, as implanted.

A primary purpose of this invention is to overcome those limitations, and to provide (1) a battery cell suitable for this application, which may be recharged periodically, and adequately within a reasonably short charging time, and (2) to provide a safety control system for controlling the charging action to prevent possible damage to the cell, and to prevent possible injury to the wearer.

An implanted cell of the present invention, with periodic safe recharge controlled by its associated protective system, will provide the required service energy for the heart-control system for a period of at least ten years, after implant, and thereby obviates the need, as now required with present conventional cells, to perform an incision to insert a replacement battery cell within less than two years after an implant.

Another limitation imposed upon present conventional cells, where energy transferring systems might otherwise be employed for the purpose of recharging the cell, is the difficulty of recharging such a conventional cell with more than a small trickle charge, which, necessarily, would require a relatively long charging time interval of the order of ten hours. This limitation in a conventional cell system, is due to the chemical conversion, by reduction of the electrode material within the cell, to a different chemical combination having a low electrical conductivity. Consequently, only a small current or trickle charge could be transmitted into and accepted by the cell.

Among the objects of this invention are to provide:

(1) A rechargeable cell suitable for this use and designed and constructed to prevent undesirable internal chemical reactions;

(2) A recharging system for safely recharging the cell implanted in place, by transfer of charging energy through the skin of the body of the wearer, from an external coil fed from an oscillator to a fixed internal coil implanted under the skin;

(3) A rechargeable cell capable of accepting a substantial current for rapid recharge in a relatively short time interval, safeguarded by appropriate control of the recharging system;

(4) A recharging system permitting and safely controlling such rapid recharging action within predetermined safety limits; and (5) A rechargeable cell having a structural enclosure inert to the nascent ingredients of the cell on recharge.

An important object of the present invention is to provide a safely controlled charging system for such a cell which will permit relatively rapid recharging, within a relatively short charging interval of approximately one to two hours, so that the patient or wearer of the cell need not be confined for too long a time interval to the location of the external charging equipment, while the cell is being recharged.

In a conventional primary cell of the type generally employed to power a heart pacer, the design is essentially comprised of: (1) a positive electrode of electrochemically active material surrounded except on one side by a compatible electronically conductive container, (2) a negative electrode of electrochemically active material surrounded except on one side by a compatible electronically conductive container, (3) a combination of electronically non-conductive absorbent and microporous materials in the space separating the positive and negative electrodes, such absorbed and microporous materials are infused with a suitable ionically conductive liquid electrolyte, and (4) an electronically insulating resilient gasket interposed and compressed between the positive and negative electrode containers along their meeting edges and thus serving to isolate the containers electrically and also to seal mechanically the internal contents of the cell within the conductive containers.

During the discharge of such a conventional cell with a mercuric oxide positive electrode, as the depolarizer, the final reaction product is liquid metallic mercury. Since mercuric oxide has relatively poor electronic conductivity, it is customary to improve the conductivity of the positive electrode by including a minor percentage, for example, 6% by weight, of a compatible electronically conductive material, such as graphite. This aids the necessary accessibility to each particle of mercuric oxide to electrons to support the discharge reaction at such positive electrode.

In the normal discharge of the mercuric oxide electrode there is a tendency of the liquid mercury thus formed to coalesce into globules due to the high surface tension of mercury. As the discharge proceeds to completion the globules become larger and more numerous. In a primary cell this does not usually create any problem, since the liquid mercury formed does not interfere with complete discharge of the remaining undischarged mercuric oxide. Deleterious migration of the metallic mercury with might cause premaurue failure, due to interelectrode shorting, is prevented by interposing appropriate barrier materials to constrain mechanically the liquid mercury within the positive electrode.

However, in the case of rechargeable positive electrodes containing mercuric oxide, the formation of large globules of mercury is undesirable. The effect of the large globules is to reduce the reactive surface area available during recharging, and thus to inhibit charge acceptance. Additionally, as the electrode is cycled between its charged and discharged states, it becomes increasingly less homogeneous due to agglomeration of mercury in globules and consequent separation from the conductive graphite particles. This decreases the efficiency of the electrode with a conventional cell construction.

To overcome the serious defects of the mercuric oxide-graphite formulation of the conventional cell, that would make recharging ineffective and unsatisfactory for the use and application here considered, the graphite is replaced by an equivalent volume of very finely divided silver powder, in amount, for example, 30% by weight, intimately mixed with the mercuric oxide. This mixture functions well both on discharge and on recharge. First, the excellent electronic conductivity of silver aids in supporting the discharge reaction. Then, because the silver powder is of very small particle size and uniformly distributed throughout the electrode, as and when the mercuric oxide is reduced to mercury, on discharge, the mercury is immediately held in place by amalgamation with the silver, and the undesirable globules of mercury do not form. On recharge, the mercury is available and converted in place, back to mercuric oxide. Thus, the electrode remains homogeneous through successive cycles of discharge and recharge, and its dimensional structure does not change.

A further advantageous consequence of the inclusion of finely divided silver powder intimately mixed with the mercuric oxide positive electrode material is that it makes possible a recharge limiting feature not otherwise obtainable. This feature depends for its effectiveness on the potential difference between the charging voltage required to oxidize liquid mercury to mercuric oxide and the charging voltage required to oxidize silver to silver oxide. In a practical cell containing metallic zinc as the negative electrode material and a mercuric oxide-silver mixture as the positive electrode material, on discharge, the zinc is oxidized to zinc oxide and the mercuric oxide is reduced to liquid mercury. On recharge the zinc oxide is reduced back to metallic zinc and the metallic mercury is oxidized back to mercuric oxide. Ideally, the charging process should be terminated as soon as substantially all of the available mercury is converted back to its charged form of mercuric oxide.

In cells manufactured using graphite to improve the conductivity of the positive electrode, if charging is continued beyond this stage, oxygen gas is generated at the positive electrode by electrolysis of the water constituent of the electrolyte. The undesirable result of a continuation of charging in these circumstances is an increase in internal cell pressure, a distortion of the cell container, and ultimately rupture of the cell container with release of cell contents to the environment. However, with finely divided silver substiuted for the graphite and distributed homogeneously throughout the positive electrode, a remedy is readily obtained.

In practise, upon recharging a discharged cell of this invention the oxidation of the mercury to mercuric oxide is accompanied by a uniform increase of the cell terminal voltage from 1.4 volts to 1.6 volts, at which point, substantially all of the available mercury has been charged. Now, if the charging is continued, instead of oxygen gas being generated, the cell terminal voltage increases rapidly through a transition phase to 1.7 volts and the metallic silver constituent of the positive electrode is oxidized to silver oxide accompanied by a uniform increase of the cell terminal voltage from 1.7 volts to approximately 1.9 volts. However, it is not desirable that any substantial portion of the silver be so oxidized.

Therefore, to avoid this undesirable action, and to take advantage of the clearly defined 1.6 volt to 1.7 volt transition range between completion of recharge of the mercury constituent and initiation of undesired charge of the silver constituent, the charging apparatus is so designed as to terminate automatically the delivery of charging current to the cell, as the cell terminal voltage rises through the transition range, with complete cessation of charge at a cell terminal voltage of 1.7 volts approximately.

In a rechargeable cell of this invention, an additional feature by which improved operation is obtained involves the use of silver plating on the interior surfaces of the positive and negative electrode containers.

In a conventional primary cell of the type generally employed to power a heart pacer, both the positive and negative electrode containers are formed from cold rolled steel sheet material. In the case of the negative electrode container, the inside facing surface of the steel is covered with a thin, continuous layer of metallic tin, either by electroplating or by a hot dip process. This is necessary to prevent any contact between the amalgamated zinc negative electrode material and the steel of the container. Such contact, if allowed, would produce a localized electrochemical reaction betweenn the zinc negative electrode material and the steel of the container resulting in nonuseful oxidation of zinc to zinc oxide, with consequent loss of cell electrochemical capacity, and also the evolution of hydrogen gas, consequent increase in internal pressure of the sealed cell, and ultimately rupture of the cell container.

The use of tin plating in a conventional primary cell avoids this difficulty since no undesirable localized electrochemical reaction occurs between the amalgamated zinc and the tin plated surface of the negative electrode material container. In the normal discharge of such a conventional primary cell employing an amalgamated zinc negative electrode and a mercuric oxide positive electrode, the zinc is oxidized to zinc oxide and the mercuric oxide is reduced to metallic mercury. This electrochemical reaction continues so long as the external discharge circuit draws current and so long as there is available metallic zinc remaining.

The negative zinc electrode is normally capacity limiting since the reacting quantity of positive electrode material is provided in excess of that amount for exact electrochemical capacity balance. When substantially all of the available zinc is exhausted, the voltage of the cell decreases and then a further reaction commences at a lower electrochemical potential oxidizing the tin coating on the inside surface of the container to tin oxide and continuing the reduction of mercuric oxide to mercury at the positive electrode.

In the normal discharge of such a primary cell, the conversion of the tin coating to tin oxide does not produce any undesirable effects since the limiting active zinc electrode has been exhausted and the cell has already delivered all of its stored energy.

However, in a rechargeable cell, oxidation of the protective plating on the base steel negative electrode container from tin to tin oxide has two deleterious effects which inhibit the recharge performance of the cell. First, the integrity of the plated surface is disturbed and the underlying base steel is exposed to the interior of the cell, and, when zinc oxide is reconverted to zinc by recharging, the undesirable localized reaction between zinc and steel will occur with destructive hydrogen gas generation. Second, the tin oxide formed is a relatively poor electronic conductor compared to the original tin coating. On recharge this tin oxide layer will interfere with the necessary conduction of electrons from the negative electrode container to the negative electrode proper.

This invention substitutes a coating of electroplated silver approximately 0.001 inches in thickness for the tin coating on the interior surface of the negative electrode container. Silver well satisfies the requirements for the negative electrodecontainer plating layer since it is an excellent electronic conductor and also since it does not participate in any undesirable localized cell reaction with amalgamated zinc. The most important advantage of silver, however, is that during discharge when substantially all of the available zinc is oxidized to zinc oxide, the silver remains unaffected by a continued discharge, thereby retaining its protective surface integrity against exposure of the underlying steel and also retaining excellent conductivity for the recharge phase.

This ability of silver to remain unaffected is due to the fact that its position in the electromotive series of elements is more noble than that of mercury and hence the electromotive force is in a direction opposite to that necessary to support an oxidation reaction of the silver. Thus the silver plated surface will retain its desirable properties through successive discharge and charge periods.

In a conventional primary cell of the type used to power a heart pacer, the inside facing surface of the positive electrode container is covered by an electroplated layer of metallic nickel. This plating serves principally to cover the underlying base steel material to prevent corrosion of the steel during storage and handling prior to and during manufacturing operations and thus to maintain a highly conductive surface for contact with the positive electrode proper. In the normal discharge of such a primary ceil, wherein the positive electrode is a compacted intimate mixture of mercuric oxide and graphite, as the mercuric oxide is reduced to liquid mercury adequate electronic contact is maintained with the nickel surface since the liquid mercury, a good electronic conductor, naturally forms into globules which make contact with said nickel surface.

In the rechargeable cell of this invention, however, wherein the positive electrode consists of a compacted intimate mixture of mercuric oxide powder and silver powder, the liquid mercury formed as a result of the discharge combines with the silver powder by amalgamation and thus is restrained from forming globules. This tendency of the mercury to coalesce with the silver reduces the contact with the positive electrode container. To prevent this from occurring, and to maintain uniform and continuous contact between the positive electrode and its container, this invention substitutes a coating of electroplated silver approximately 0.0005 inches in thickness for the nickel coating on the interior surface of the positive electrode container. Such a silver surface has excellent electronic conductivity for both discharge and recharge. Also, the mercury of the discharge reaction simultaneously amalgamates the distributed silver of the positive electrode proper and the silver plated surface of the positive electrode container. This promotes uniformity of electrode composition and continuous electronic conductivity at the electrode-contatiner interface. On recharge, the silver plated surface is maintained in the metallic silver state since the delivery of charging current to the cell is terminated automatically as the cell terminal voltage reaches 1.7 volts approximately, which voltage is the threshold voltage for the oxidation of silver at the positive electrode in this system.

Thus by keeping the silver in its same stabilized constant metallic phase during discharge and recharge, the high conductivity condition is maintained constant, and independet of the primary or secondary functioning of the cell.

In order to recharge the cell, a voltage for that purpose is received from a secondary coil of an inductive pair as a transformer, with the primary coil energized from a suitable oscillator outside the human body, while the secondary coil is permanently fixed in place under the skin of the carrier. The secondary coil is inductively energized from the primary through the skin, and supplies the received energy through a rectifying assembly which serves as the cell charger with sufficient ability to supply, for example, a current of 28 milliamps to the cell. That current charge is applied for different time intervals or different circuit conditions, to convert the metallic mercury to its mercury oxide form during the first stage of charge and then continues through the second stage of limited voltage to charge the cell to the condition desired.

In order to protect the silver from changing its condition to an undesirable oxidized condition, the voltage across the cell is prevented from rising above 1.7 volts, by the provision of a stabilizing circuit which tends to short-circuit the cell at a voltage of and above 1.7 volts, so that the charging circuit is short-circuited at the limit voltage of 1.7, but the cell is not affected by the short circuit since that short-circuiting condition changes when the voltage of the circuit and cell drops below 1.7 volts.

By means of such a voltage sensing and stabilizing system permanently connected to the cell, together with the charger and the secondary inductive coil for receiving the energy through the skin, the entire cell and its recharging circuitry may be installed as a permanent implant under the skin of the human body, to serve for a long time period, without need for any further incisions or openings of the skin to replace the cell.

When cells of these kinds and types are used for general or industrial purposes, one of the general problems has been the migration of particles between the electrodes, in such manner as to cause internal short circuits that lead to breakdown of the cell. Such a defective or used industrial cell could easily be discarded and replaced.

For the present application, however, the cell cannot be easily and readily discarded. An extremely important feature of the cell design, therefore, must be such as (1) to assure that there will not be any physical particle movement, within the cell, and between the electrodes, to disturb the original structural disposition of the electrode material; and (2) to limit any internal electrical activity solely to ionic transport of electrical charges between the two electrodes.

Thus, the two features provided by this invention, which are basic imperatives, and which, by their presence, make this invention system operative at the high safety level required, are these:

(1) First, a novel rechargeable cell that is of a construction that enables it to serve as a primary cell to supply the energy needed for the heart-controlling system, and that will be rechargeable to serve for a subsequent further period of operation as a primary cell; with a physical construction that will assure a permanent and constant physical disposition and dimensional arrangement in electrically anchored position, with internal movement in the cell restricted to ionic energy transport; and (2) Second, a control circuit that closely and accurately controls the charging voltage that may be applied to the cell, in order thereby to prevent any excess voltage from acting on the cell to cause any substantial internal disturbance or chemical reaction, beyond the desired natural capabilities and intended utilizable physical and chemical characteristics of the cell components.

To maintain the fixed disposition of the internal components, and to confine the particles against migration, the novel features of the cell construction of this invention provide a substantially closed compartment for each electrode structure. This is accomplished by interposing a multi-layer arrangement of ionically permeable, electronically non-conductive microporous separators in the space between the electrodes. The outer peripheral surface of the multi-layer separator is engaged and compressed by an annular insulating ring, which, in turn, is engaged and compressed by the resilient cell sealing gasket in such a manner as to seal and isolate the positive and negative electrodes against any migration of particulate matter between them. When the separator layers and electrode elements are infused with an ionically conductive electrolyte, unimpaired ionic transport occurs through the said ionically permeable separators.

The construction of the cell and the operating characteristics of the system of the control circuitry are more fully described in the following specification, taken together with the drawings, which show the details of construction and arrangement of the cell and of the control circuitry more fully, and in which.

This invention generally involves, first, the construction of a small cell, suitable for implanted use in a heart-pacer system, and which may be recharged in place, in order to permit the cell to have a relatively long life without substitution; and the invention further includes a related implanted voltage control system for automatically controlling the recharging of the cell within proper voltage limits that will prevent undesirable internal chemical reactions in the cell that would detrimentally affect certain elements of the cell, that are utilized to permit the recharging of the cell. The cell and its control system are designed to be implanted in an available region under the skin of a human, so the cell may be recharged inductively through the skin, to enable the cell to be operative over a long period of time presently deduced to be at least ten years to maintain the conditions that will maintain a human heart in active operation.

Figure 1:
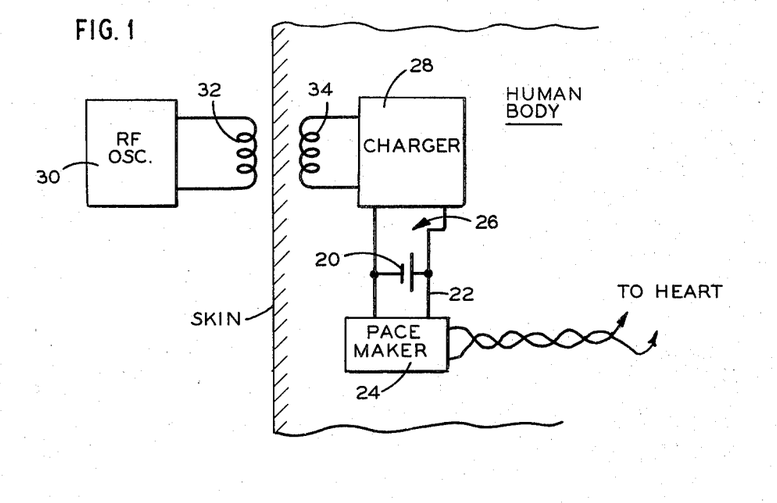
FIG. 1 is a schematic diagram of the entire circuit including the pacemaker cell and control circuit with receiving antenna, all implanted; and an outside transmitting antenna coil with energizing oscillator for charging operation.

As shown in FIG. 1, a circuit arrangement is schematically indicated whereby energy from an external source outside of the human body, such as a radio frequency oscillator can supply energy inductively to the recharging circuit including the cell for the heart controlling system.

As shown in FIG. 1, an electric cell 20, constructed in accordance with this invention, described in detail below, is provided to energize a control circuit 22 leading to a pacemaker device 24 for insuring regular operation of a human heart of the patient or wearer of the equipment.

In order to enable the voltage of the cell 20 to be kept sufficiently maintained to perform its intended function, an implanted charging circuit 26 for the implanted battery cell is arranged to be energized through a charger 28 for converting input high frequency alternating current to output low voltage direct current, of appropriate voltage to charge the battery 20. Input energy to the charger for the battery is supplied from a suitably operated and controlled radio frequency oscillator 30, operating at radiation frequency to energize a radiating transmitting antenna coil 32 that is disposed adjacent or against the skin of the body or patient of the wearer of the heart control equipment. Energy from radiating antenna coil 32 is received by a receiving anetnna coil 34, that is permanently implanted under the skin of the body of the wearer. That receiving coil 34 supplies its received energy as input to the charger 28, which converts the input high frequency low voltage, as received from coil 34, to low voltage direct current through suitable rectifying circuitry, which is not part of the present invention, to a value within a suitable range, such as, for example, 1.4 volts to a value of approximately 1.7 volts.

The requirement to limit the applied recharging voltage to approximately 1.7 volts is to avoid oxidation to silver oxide of both the finely divided silver constituent of the positive electrode and the silver plated surface of the positive electrode container.

Figure 2:
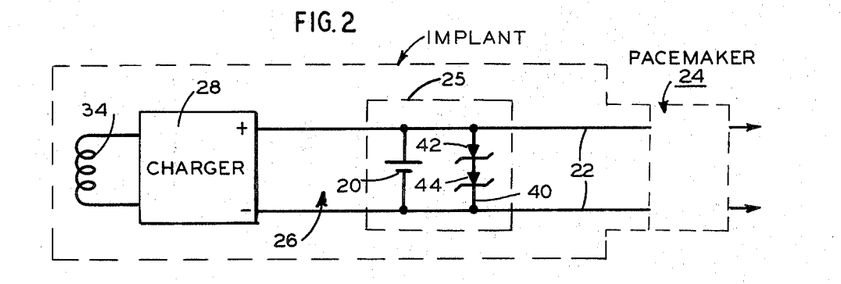
FIG. 2 is a schematic diagram of the control circuit including the cell, its charger, and the protective bridging circuit to prevent overvoltage application to the cell.

FIG. 2 shows the control circiutry employed for controlling the voltage applied to the operating cell, and includes the charger 28 of FIG. 1, the charging circuit 26 to the cell 20, and a voltage control and limiting circuit 40 which includes two Zener breakdown diodes 42 and 44 connected in series to bridge the battery cell 20 and to serve as a breakdown bridging or bypass path for current around the cell 20 when the voltage of the charging circuit 26 to the cell exceeds 1.6 volts. Thus, the voltage applied to the cell is kept below the value of 1.7 volts, which would be inappropriate and harmful to the cell 20 that is constructed in accordance with the features and principles of this invention.

Figure 3:
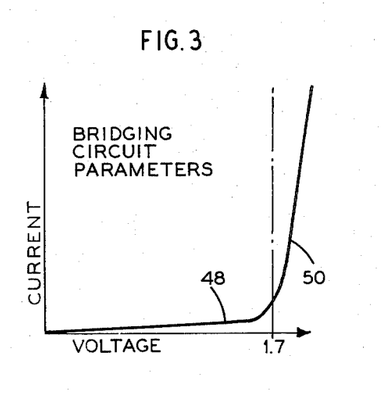
FIG. 3 is a graph showing the operation of the Zener diode bridging circuit of FIG. 2.

FIG. 3 shows in simple graphical form how the voltage limiting circuit 40 operates by breakdown or avalanche action from a value below 1.7 volts, and indicates how the breakdown voltage value of voltage-limiting circuit 40 is made to occur at a value between 1.6 and 1.7 volts in the charging circuit across the cell 20. As indicated in FIG. 3, as long as the charging voltage is below substantially 1.6 volts, the charging current enters the cell 20 to recharge the cell. In the voltage region from 1.6 volts to just under 1.7 volts, a small current begins to flow through the bridging circuit of the diodes. As the voltage reaches the neighborhood of 1.7 volts and exceeds that value, the diodes 42 and 44 break down with the so-called "avalanche" effect and provide a low resistance path to the current as shown in the portion 50 of the graph, so that the voltage on the cell 20 is kept from exceeding 1.7 by the shunting effect of the voltage limiting circuit 40. Two diodes are shown to indicate more than one diode will be used, as necessary, for the total breakdown voltage value desired.

Figure 5:
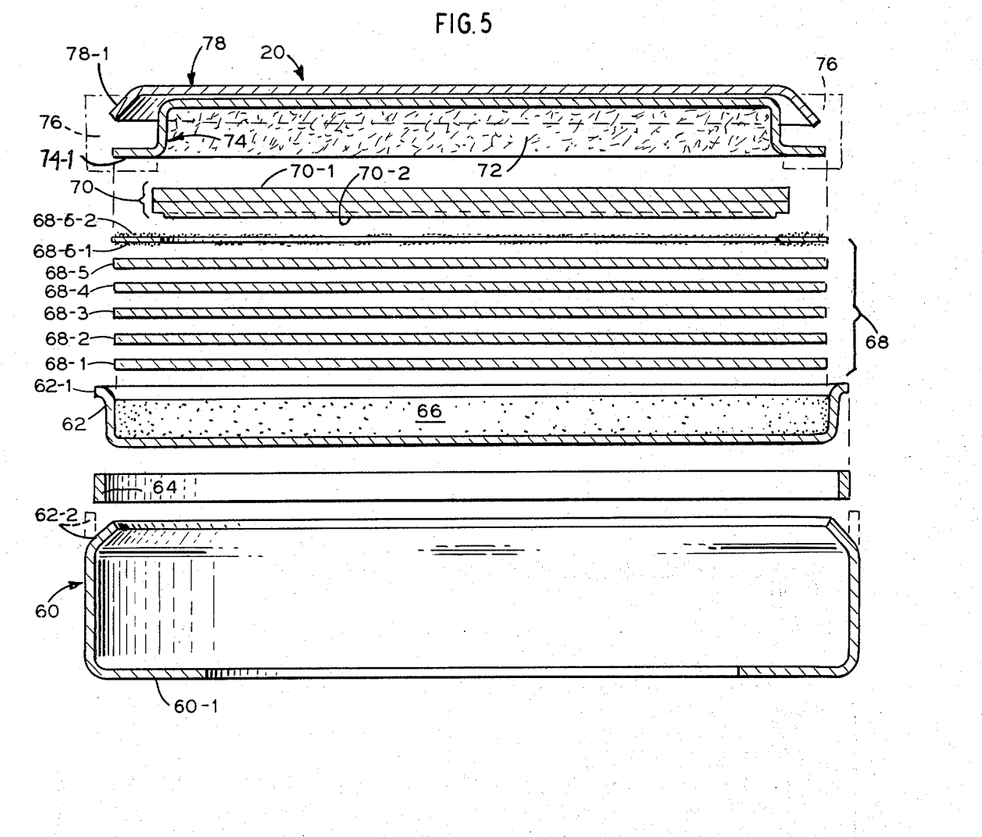
FIG. 5 is an exploded view of the cell elements.

The exploded view of FIG. 5 shows the specific elements of the cell 20 of this invention. Commencing from the bottom of the figure, the cell 20 is shown as comprising:

A cylindrical nickel-plated steel housing 60 having

A bottom internal annular seating flange 60–1;

A shallow circular cylindrical silver-plated steel tray serving as the positive electrode container 62 to seat on said annular flange 60–1, with A spacer tube 64 of kraft paper material to rest between the outer wall of the positive electrode container 62 and the inner wall surface of the nickel-plated steel housing 60, with said spacer 64 serving as a circular spacing rest for a peripheral flange 62–1 on the positive electrode container 62;

A flat positive electrode pellet 66 compactly pressed into the positive electrode container 62, the positive electrode pellet consisting of a homogeneous mix of 30% silver and 70% mercuric oxide;

A multi-layer barrier 68 consisting of a stack of microporous layers or laminations functionally serving to block migration of any particulate matter from one electrode region to the opposite, and yet simultaneously permitting the unimpeded passage of ions necessary for electrochemical cell discharge and recharge.

A relatively thicker layer 70 of absorbent material for holding and immobilizing a substantial portion of the electrolyte of the cell;

A relatively thick layer of negative electrode material 72 consisting substantially of a homogeneous mix of 90% of amalgamated metallic zinc powder and 10% of a conductive epoxy binder, with an adequate content of metallic silver powder to make the epoxy binder highly conductive as well;

An upper silver plated steel tray serving as the negative electrode container 74, containing and supporting the negative electrode material 72, with an annular flange 74–1 encircling the rim of the negative electrode container 74;

A silver plated steel outer top disc 78 electrically resistance welded to the outer surface of the negative electrode container 74 to insure good electronic conductivity between these two top metallic elements 74 and 78, with the outer top disc 78 having its circular rim border 78–1 slightly flanged and curved downward. The welded assembly of the two top metallic elements 74 and 78 is insert molded into a high density polyethylene annular ring 76 in such a manner as to anchor securely both the annular flange 74–1 of the negative electrode container 74 and the flange 78–1 of the outer top disc 78 within the polyethylene ring 76. Said polyethylene ring 76 serves as an annular sealing element for the cell. For such sealing action, the outer circular wall of the nickel-plated steel housing 60 is crimped inwardly at its upper edge 60–2 to press down on the polyethylene annular sealing ring 76 which serves as a grommet to be held in place by pressure from the crimped edge 60–2 of the outer steel housing 60, with the grommet 76 serving in turn to press against the metallic elements 74 and 78 in hermetically sealed relationship and thus to seal the cell closed.

Figure 6:
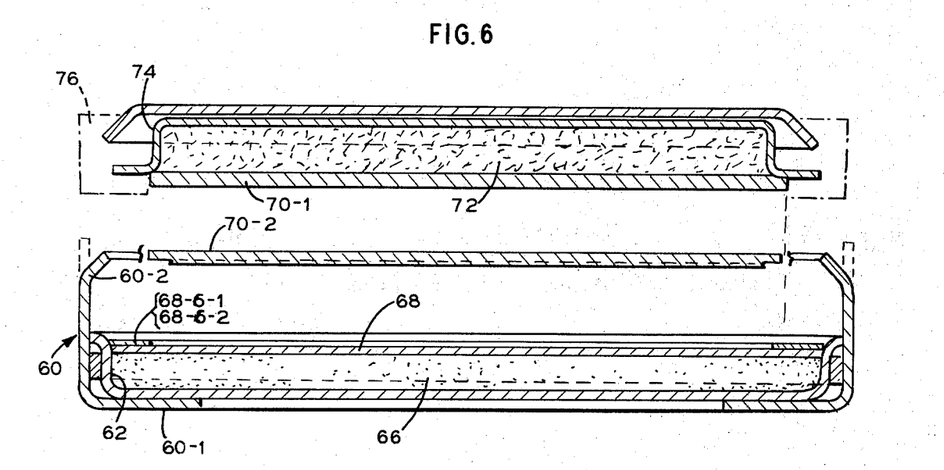
FIG. 6 is a schematic exploded sectional view showing the two cell electrodes separately encased.

An important feature of the invention which involves confining the material of each electrode in its own environment and container, is schematically indicated in FIG. 6. The positive electrode pellet 66 is disposed in the positive electrode container 62 and is confined in that shallow pan container by the covering barrier of multi-layer microporous structure 68, which serves as a closure for the shallow container, and which prevents egress of any particles from the container. A marginal polyethylene sealing washer 68–6, coated on its surfaces with adhesive materials, is assembled to the top surface outer periphery of the multi-layer barrier structure 68.

In the final assembly, the sealing washer 68–6 is pressed tightly between the top surface outer periphery of the multi-layer barrier srtucture 68 and the under surface of the polyethylene grommet 76. The adhesive coating on the under surface of the washer 68–6–1 effectively seals the washer-barrier interface. Similarly, the adhesive coating on the upper surface of the washer 68–6–2 effectively seals the washer-grommet interface. Thus the positive electrode 66 is isolated by adhesively sealed boundaries against any migration of particulate material around the edges of the multi-layer barrier structure 68 and into the negative electrode region.

As further shown in FIG. 6, the negative electrode material 72 is partially confined within the negative electrode container 74 by a layer of absorbent material 70. The negative electrode material mix consists of 90% metallic zinc particles, held by the balance of 10% of a binder of conductive epoxy and related hardener. The epoxy as a binder is itself electrically insulating, but is here mixed with metallic silver powder for good electrical conductivity to the distributed zinc particles. The absorbent separator 70 is preferably provided in two parts, or layers, an upper 70–1 and a lower 70–2.

The total absorbent separator element 70, including both layers, is disposed between the negative electrode container 74 and the positive electrode container 62, and serves as a physical spacer to separate the two electrodes and also to provide volumetric space sufficient to accommodate the fluid electrolyte that will be disposed in the cell to serve as an ionic conductor between the electrodes. However, the absorbent separator layer 70 is relatively porous and insufficient by itself in preventing the particulate material from migrating through the absorbent layer. The ultimate constraint against the migration of negative electrode particulate material 72 is the multi-layer barrier structure 68. As in the case of the positive electrode, the sealing action of the adhesive coated surfaces 68–6–1 and 68–6–2 of the sealing washer 68–6 against the peripheral surface of the multi-layer barrier structure 68 and the polyethylene grommet 76 prevents any particulate negative electrode material 72 from migrating around the edges of the barrier structure 68 and into the positive electrode region.

Figure 7:
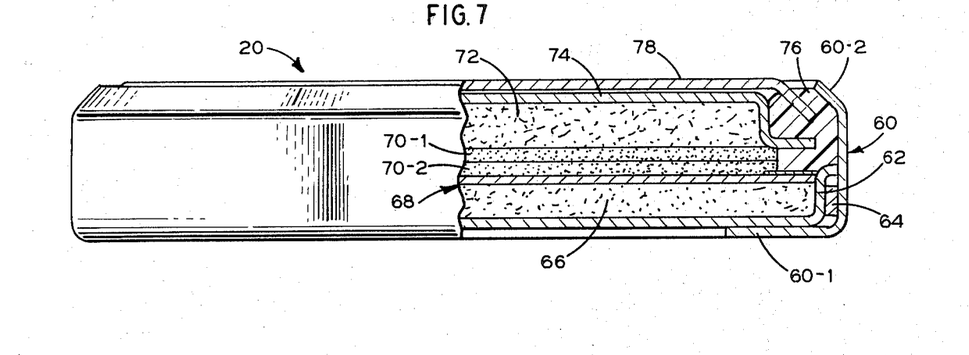
FIG. 7 is a side elevational view, partly in section, of the assembled cell.

When the elements shown in FIG. 6 are then combined for the final cell assembly, the final structure is compressed to the form shown in FIG. 7. The cell when finally shaped as in FIG. 7 is approximately one and one-half inch in diameter and about one-quarter inch in thickness. With such small dimensions, any free loose particle would need but little travel to do unpredictable damage to the cell. But, by locking each mass of electrode material in its own container space, any such dangerous movement of electrode material is prevented.

The iodes 40 that are used in the bridging circuit to limit the voltage that may be applied to the cell 20, are respectively of a dimension approximately $\frac{1}{16}$ of an inch in diameter and less than one-eighth of an inch in axial length, so that the two diodes take up a limited amount of space which can be readily accommodated within the chest area of a human body, in space adjacent to the heart.

The application and location of the cell again imposes a practical human problem in connection with recharging cell. With a conventional cell, the small trickle charge that might be possible would require a charging time of as much as ten hours to recharge the cell to its desired operating voltage That would compel the patient to be confined to the location of the charging equipment containing the high frequency oscillator and the transmitting antenna, or at least require that long time coupled to the equipment event if portable and movable to the patient. Obviously such a constraint is awkward and undesirable. Thus, this problem has also been present, and required solution, to provide a satisfactory safe cell and a safe charging system that would permit recharging of the cell within a much shorter time interval than ten hours. Among the features of this invention, is the cell structure provision with the protective silver layer to provide high conductivity in the circuit for the recharging current. Consequently, with a larger charging current thus possible and permitted, the time required to introduce the recharging energy into the cell can be diminished. In the case of the cell of this invention such charging time has actually been reduced to a time interval less than two hours.

Another factor that contributes to the shorter recharging time, is the higher value of charging current permitted by the formulation of the depolarizer material, in which silver powder is utilized instead of the conventional graphite powder. The silver powder provides not only better conductivity than the graphite, but serves also as a holding and retaining medium for preventing any shifting movement of liquid mercury which is formed by reduction of mercuric oxide upon normal discharge operation of the cell. The silver particles serve to hold the mercury, immediately upon release, as an amalgram, which has two beneficial effects. First, the mercury is retained substantially in place without movement so that upon reoxidation and of recharging, the mercury occupies the same space as in its original manufactured disposition.

Thus, during discharge and later, during recharge, the structural formation of the depolarizer pellet remains dimensionally constant and undisturbed. There is thus no swelling, or change of dimension, that would affect its physical, and then possibly chemical reactions due to such structural dimensional change.

The additional beneficial feature is that by the amalgamating action of the silver in holding the mercury in position, the extremely small mercury globules are not permitted to coalesce into larger globules. The result of that is, that available current or charge receiving surfaces of the mercury globules are maintained at their initially maximum quantities and areas, and are not diminished by the combining of the minute globules into larger globules, with naturally reduced total surface area.

The feature of keeping the applied voltage of the cell from reaching a value above 1.7 volts, which would then be sufficient to oxidize the silver, permits the beneficial effects of silver in the cell, and the relatively rapid recharging.

Figure 4:
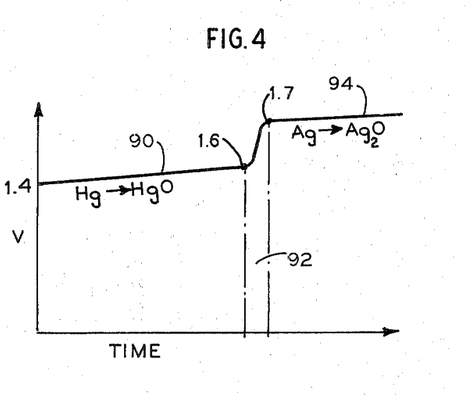
FIG. 4 is a voltage graph showing the safe operating charging range for mercury conversion, and the voltage range which would undesirably affect the finely divided silver constituent of the positive electrode and the silver plated surface of the positive electrode container on overvoltage charge.

That feature of voltage control is achieved by the bridging circuit as shown in FIG. 2. The graph of FIG. 4 may now be considered, to better appreciate the manner in which this highly selective control is achieved and functions. The discharge of the cell may cause the cell voltage to drop from normal value of 1.6 volts to a value somewhere between 1.3 and 1.6 volts. The cathodic mercuric oxide is reduced to metallic mercury during such discharge. On recharge, the cell voltage will be raised, along the graph line section 90, during which time the metallic mercury globules, held by the silver particles, in the cathodic positive electrode material, will be reconverted to mercuric oxide, as the battery is recharged. When the cell is charged and cannot accept further charge, the applied voltage is no longer held down to the cell voltage, and rises. In the region 92, between 1.6 volts and 1.7 volts, the applied voltage begins to rise until the value of 1.7 volts is reached. At that value of applied voltage, the metallic silver surfaces of the positive electrode container and the distributed silver particles in the positive electrode material would be oxidized to silver oxide in region 94, with reduced conductivity in the cell in its primary cell duty. To prevent that, the control bridging circuit 40 of FIG. 2 is provided.

The construction and disposition of the elements of the cell are better shown in the exploded view of FIG. 5.

As indicated in FIG. 5, the positive electrode container 62 is to be positioned in the nickel plated steel housing 60 to seat on the flange 60–1, with a small tube of Kraft paper 64 positioned as a spacer between the wall of the container and the nickel plate steel housing, to provide some adjusting space for the rim flange 62–1 in fitting into the diametrial space within the outer housing 60.

The material for the positive electrode pellet is first formed as a homogeneous mix containing 30% of silver powder and 70% of mercuric oxide, after which a sufficient amount of the mix is placed and distributed in the positive electrode container 62 to fill the container over its entire area and to its full depth, when compressed.

On top of the positive electrode pellet is placed the multi-layer barrier 68 which is a composite multi-layer structure to provide the various functional features that are desired in the barrier in order to contribute to the satisfactory operation of the cell, that will permit the cell to function in discharge and to accept recharge, over a long operating time.

Tests that have been conducted on the cell of this invention indicate that a minimum life expectancy of ten years may well be expected and safely relied on.

Among the properties desired in an ideal barrier are:
1. High ionic conductivity to OH⁻ ions necessary for the cell electrochemical discharge and charge reactions.
2. Impenetrability to particulate material either present in the original electrodes or formed as a product of the cell electrochemical discharge and charge reactions, and
3. Resistance to chemical attack by constituent materials of the cell.

Conductivity of OH⁻ ions depends in part on the ability of the barrier material to retain a substantial amount of electrolyte, in this instance potassium hydroxide (KOH), distributed throughout the barrier. Impenetrability to particulate material depends in part on the maximum pore size of the barrier material, the tortuosity of the path of interconnected pores through the material, and the thickness of the material. Resistance to chemical attack depends on the chemical and physical properties of the material. These three desired properties do not generally occur simultaneously in a single material. It is a feature of this invention to combine several thin layers of three different materials to construct a multi-layer barrier which, by combination of the desirable properties of the individual layers, collectively provides a total structure possessing the properties necessary to assure proper operation of the cell.

The multi-layer barrier 68, as shown in FIG. 5, consists first of a thin layer disc 68–1 of microporous polyvinylchloride (PVC), ten thousandths (0.010) of an inch thick and of approximately 80% porosity. This material has excellent long term oxidation resistance and a high retention of electrolyte. It is, however, only partially effective against penetration by particulate materials due to its relatively large average pore size. In order to eliminate any trapped air, the circular disc 68–1 of PVC is first wetted with the electrolyte before it is placed on the positive electrode pellet, which has previously been saturated with electrolyte, thereby eliminating any air from the pellet.

On top of the first layer 68–1 is placed a second thin layer disc 68–2 of irradiated polyethylene, one thousandth (0.001) of an inch thick. This material is commercially available in the trade name Permion and has excellent long term oxidation resistance as well as good resistance to penetration by particulate materials due to its relatively small average pore size. It is, however, relatively less capable of retaining electrolyte and it is for this reason that a relatively thinner layer thickness is used. It also is prewetted with electrolyte before it is placed on top of the first layer 68–1.

On top of the second layer 68–2 is placed a third thin layer disc 68–3 of regenerated cellulose, four thousandths (0.004) of an inch thick. This material is commercially available in the trade name Visking and has excellent resistance to particulate material penetration due to its extremely small pore size. Also it has a high degree of electrolyte retention due to the ability of cellulose to absorb elcetrolyte. However, in the presence of oxidizing substances such as the mercuric oxide in the positive electrode, it is slowly degraded by chemical reaction between such oxidizing substance and cellulose. This third layer 68–3 is also prewetted with electrolyte before it is placed on top of the second layer 68–2.

On top of the third layer 68–3 is placed a fourth thin layer disc 68–4 of irradiated polyethylene identical in size and composition to 68–2 and also prewet with electrolyte. On top of the fourth layer 68–4 is placed a fifth thin layer disc 68–5 of regenerated cellulose identical in size and composition to 68–3 and also prewet with electrolyte.

On top of the fifth layer 68–5 is placed a thin annular polyethylene sealing washer 68–6, the lower surface 68–6–1 and upper surface 68–6–2 of which are coated with adhesive. In the final assembly, this washer 68–6 is compressed between the top surface outer periphery of the fifth barrier layer 68–5 and the under surface of the polyethylene grommet 76, thus providing an adhesively sealed boundary between the positive and negative electrode regions of the cell, to prevent migration of partciles from one side of the multi-layer barrier to the other side, where such migration and movement of the particles would have a harmful effect on the operation of the cell.

The importance of limiting the migration of even small particles may be grasped from the fact that the overall cell dimensions are about one and one-half inch in diameter, and the thickness is less than one-fourth of an inch. Even a small particle that would migrate from the electrode region of the cell into the other region where it is not desired could create a local voltage concentration point with a miniature cell-type activity that could impose a continuous internal virtual load on the cell, and thereby could reduce its normal operating voltage and constitute a continuing elemental short circuit within the cell.

The preferred order of arrangement of the three different materials into the five layer structure of the multilayer barrier 68 is essential to the proper functioning of the cell and is based upon three principles. First, the outermost barrier layers, 68–1 and 68–5, should be constituted of materials with a high degree of electrolyte absorbency or retention. This is characteristic of the microporous polyvinylchloride used for 68–1 and the regenerated cellulose used for 68–5. The reason for this requirement is that a high degree of electrolyte retention in these layers assures good ionic conductivity to the next adjacent cell elements which are the positive electrode proper 66 and the absorbent layer 70 respectively. Secondly, the barrier layers, 68–1 and 68–2, closest to the chemically active mercuric oxide of the positive electrode 66 should be constituted of materials with a high degree of resistance to chemical attack by mercuric oxide. This is characteristic of the microporous polyvinylchloride used for 68–1 and the irradiated polyethylene used for 68–2 and 68–4. The reason for this requirement is that mercuric oxide is sufficiently active as to oxidize and degrade some materials, such as regenerated cellulose, otherwise excellent as barrier materials. The interposition of non-reactive layers between the oxidizing agency and the layers susceptible to oxidation greatly extends the useful functional life of the oxidation susceptible layers by separating them from the oxidizing agency. Third, barrier layers with the least capability for the retention of electrolyte, 68–2 and 68–4, should be bounded on each side by layers with a high capability for the retention of electrolyte, 68–1, 68–3 and 68–5. In this instance the microporous polyvinylchloride used for 68–1 and the regenerated cellulose used for 68–3 and 68–5 have excellent electrolyte absorbency and retention whereas the irradiated polyethylene used for 68–2 and 68–4 is relatively very much less effective in retention of electrolyte. The reason for this requirement is to insure that at each interface between adjacent barrier layers at least one of the layers at such interface has sufficient electrolyte to wet the surface of the adjacent less electrolyte retentive layer. This will greatly enhance ionic conductivity through successive layers of the barrier structure resulting in higher cell terminal voltage on discharge, higher current carrying capabilities, and more efficient cell utilization.

In operating and testing the cells and the system for reliability, tests of rechargeable mercury cells of the Mallory Battery Company, identified as RMCC–1420S, were conducted on programs simulating continuous discharge with weekly recharge as in Test I and continuous discharge with daily recharge as in Test II. In Test I each cell was discharged at 400 microamperes (on a 3375 ohm load resistor) continuously, a rate which is equivalent to a delivered capacity of 67.2 milliampere hours (mah.) per week. Recharge was accomplished on a "stabistor" regulated charger at 28.0 milliamperes (ma.) continuously for 3.0 hours equivalent to a nominal recharge capacity of 84.0 mah. The cell was permanently connected to the 3375 ohm load and the charger was switched in parallel with the test cell for 3.0 hours per week. In Test II each cell was discharged at 1.0 ma. (on a 1350 ohm load resistor) continuously, a rate which is equivalent to a delivered capacity of 24.0 mah. per day. Recharge was accomplished on a "stabistor" regulated charger at 28.0 ma. continuously for 72.0 minutes equivalent to a nominal recharge capacity of 33.6 mah. The cell was permanently connected to the 1350 ohm load and the charger was switched in parallel with the test cell for 72.0 minutes per day.

The above examples are intended as illustrations and the charge-discharge program may be altered to suit new conditions. However, the following guidelines should be observed:

1. Total capacity removed on any one discharge cycle should be limited to approximately 200 mah.

2. The recharge time, calculated using the 28.0 ma. maximum recommended charge rate, should be sufficient to replace about 125% to 140% of the discharged capacity.

3. The charging equipment should be so designed as to limit the maximum charge current to 28.0 ma. The cell under charge should be regulated by a "stabistor" in parallel with the cell and so chosen that the "stabistor" will divert the entire 28.0 ma. charge current when the cell voltage reaches 1.70±0.02 volts at or near the end of charge.

Thus, by means of the cell constructed as disclosed herein, together with its control system to permit fast and safe recharging, the life of the operating cell for a pacemaker system can be greatly extended over the conventional twenty month period of a conventional cell, and the necessity for a subsequent incision for insertion of a substitute cell can be indefinitely and possibly entirely postponed for the life of a wearer.

From the instructions and disclosures herein given, the construction of the cell may be modified in design and construction, without departing from the spirit and scope of the invention, as defined in the claims annexed.

What is claimed is:

1. A secondary cell capable of implantation within a human body for energizing an implanted heart-control pacemaker, and capable of accepting, while implanted, a recharge after discharge, and comprising:

a first metal container having a silver plated electroconductive inner wall to serve as an electrode element of the cell at one polarity, and defining a first compartment, said container having a closure disposed as an opposite wall of microporous insulating material to serve as a barrier and to hold an electrolyte that is to serve as an ionic transport through said barrier;

a filling charge of positive electrode material in said first container, said positive electrode material including finely divided silver powder and mercuric oxide, all homogeneously distributed, to enable said silver particles to hold the metallic mercury in place by amalgamation to prevent migration of the liquid mercury formed when the mercuric oxide is reduced to metallic mercury upon discharge, and thereby, serving also to prevent merging of the mercury globules, and thus, to retain the homogeneous distribution of the mercury upon re-oxidation to mercuric oxide upon recharge, said silver particles not becoming oxidized upon chemical reduction of the mercuric oxide because of the relationship of the silver to the mercuric oxide in the electropotential series;

a quantity of electrolyte saturating and immersing said barrier wall and wetting said charge of positive electrode material;

a second metal container having a silver plated electroconductive inner wall to serve as a second electrode element of said cell at the other polarity of the cell, and defining a second compartment, and having a covering element disposed as an opposite wall of porous insulating material, said covering element serving as a separating spacer between said barrier wall of said first container and the charge of material in said second container in the cell when assembled;

a filling charge of negative electrode material in said second container, said negative electrode material comprising a homogeneous mixture of amalgamated metallic zinc powder, silver powder and a binder;

and means for holding said first and second containers in related disposition to constitute an electric cell.

2. A secondary cell, as in claim 1, in which a sealing element is provided on the border rim edge of said barrier layer to engage the electroconductive wall of said first container, to prevent migration of particles of said positive electrode material around and past said barrier into the space in said cell beyond said barrier.

3. A secondary cell, as in claim 2, in which said sealing element is sealingly adhered to said barrier layer around the upper border edge of said barrier layer, and, in final assembly of the two containers, adheringly seals to a surface of a structural element of said second container to close said container.

4. A secondary cell, as in claim 1, in which said barrier layer consists of a plurality of porous sheets of insulating material, at least some of which are characterized by resistance to oxidation.

5. A secondary cell, as in claim 1, in which said barrier layer contains a porous sheet of insulating material, which is characterized by inertness and resistance to oxidation.

6. A secondary cell, as in claim 1, in which said barrier layer is of high porosity with micropores of fine dimensions to assure continuous surface-wetting by the electrolyte used in the cell.

7. A secondary cell, as in claim 6, in which said barrier layer consists of a plurality of porous insulating sheets providing two functions in the barrier layer:

(1) excellent wetting acceptance and holding of the electrolyte, and (2) inertness to oxidation.

8. A secondary cell, as in claim 1, in which said barrier includes a sheet of regenerated cellulosic material, microporous with excellent wetting and holding ability for the electrolyte, although oxidation prone, and includes two inert oxidation-resistant sheets also microporous and disposed to cover and protect the cellulosic sheet against its oxidation tendency, while the holding ability of the cellulosis microporous sheet for the electrolyte serves to keep both inert oxidation-resistant sheets immersed in the electrolyte held by the cellulosic holding sheet.

9. An electric cell, as in claim 1, in which the two compartment spaces for the respective electrodes are individually closed to prevent migration of a particle from each such space during chemical reaction of discharge or of recharge.

References Cited
UNITED STATES PATENTS

| | | | |
|---|---|---|---|
| 3,440,110 | 4/1969 | Arbter | 136—166 |
| 2,772,321 | 11/1956 | Ensign | 136—120 |
| 3,310,436 | 3/1967 | Ralston et al. | 136—20 X |
| 3,272,653 | 9/1966 | Solomon et al. | 136—24 X |
| 3,485,672 | 12/1969 | Ruben | 136—111 X |
| 3,698,953 | 10/1972 | Eisenberg | 136—20 |

ANTHONY SKAPARS, Primary Examiner

U.S. Cl. X.R.

136—20, 30, 111